US012166299B2

(12) United States Patent
Peltier et al.

(10) Patent No.: US 12,166,299 B2
(45) Date of Patent: Dec. 10, 2024

(54) CABLE LUG FOR A CONNECTOR

(71) Applicants: Tyco Electronics Simel, Gevrey Chambertin (FR); Tyco Electronics Raychem GmbH, Ottobrunn (DE)

(72) Inventors: Bruno Peltier, Gevrey-Chambertin (FR); Laurent Petrignet, Gevrey-Chambertin (FR); Torsten Friedrich, Ottbrunn (DE); Christian Heindl, Ottobrunn (DE); Markus Hardi, Ottobrunn (DE)

(73) Assignee: TYCO ELECTRONICS—SIMEL ET AL., Gevrey (FR)

(*) Notice: Subject to any disclaimer, the term of this patent is extended or adjusted under 35 U.S.C. 154(b) by 287 days.

(21) Appl. No.: 17/836,106

(22) Filed: Jun. 9, 2022

(65) Prior Publication Data

US 2022/0302614 A1 Sep. 22, 2022

Related U.S. Application Data

(63) Continuation of application No. PCT/EP2020/084918, filed on Dec. 7, 2020.

(30) Foreign Application Priority Data

Dec. 10, 2019 (EP) .................................... 19306621

(51) Int. Cl.
*H01R 11/12* (2006.01)

(52) U.S. Cl.
CPC .................................... *H01R 11/12* (2013.01)

(58) Field of Classification Search
CPC ........ H01R 11/12; H01R 13/521; H01R 4/36; H01R 13/53
See application file for complete search history.

(56) References Cited

U.S. PATENT DOCUMENTS

| | | | | |
|---|---|---|---|---|
| 5,114,357 | A | 5/1992 | Luzzi | |
| 9,293,872 | B2 * | 3/2016 | Mikli | H01R 13/6315 |
| 9,954,315 | B2 | 4/2018 | Siebens et al. | |
| 10,790,598 | B2 | 9/2020 | Bürger | |
| 2006/0084307 | A1 | 4/2006 | Luzzi | |

(Continued)

FOREIGN PATENT DOCUMENTS

| | | | |
|---|---|---|---|
| CN | 1083276 | A | 3/1994 |
| CN | 2475161 | Y | 1/2002 |

(Continued)

OTHER PUBLICATIONS

Machine Translation FR 2945156 (Nov. 5, 2010) (Year: 2024).*

(Continued)

*Primary Examiner* — Travis S Chambers

(57) ABSTRACT

A cable lug for a connector includes a first portion having a receiving end receiving a cable and a second portion extending from the first portion and having a through hole through which a stud can be passed. The through hole extends transversally through a first surface and a second surface of the second portion opposite one another. At least one of the first surface and the second surface has a protrusion projecting away from the at least one of the first surface and the second surface. The protrusion is positioned between the through hole and the first portion and is spaced apart from the first portion.

20 Claims, 3 Drawing Sheets

(56) References Cited

U.S. PATENT DOCUMENTS

| | | | |
|---|---|---|---|
| 2010/0216333 A1 | 8/2010 | Hane et al. | |
| 2010/0261383 A1 | 10/2010 | Su | |
| 2011/0256746 A1 | 10/2011 | Borgstrom et al. | |
| 2013/0306345 A1 | 11/2013 | Wentzel et al. | |
| 2016/0036141 A1 | 2/2016 | Lawson | |
| 2019/0319373 A1 | 10/2019 | Mori et al. | |
| 2022/0085523 A1* | 3/2022 | Scharkowski | H01R 43/0214 |

FOREIGN PATENT DOCUMENTS

| | | | | |
|---|---|---|---|---|
| CN | 2593432 | Y | 12/2003 | |
| CN | 201466245 | U | 5/2010 | |
| CN | 102790296 | A | 11/2012 | |
| CN | 202977770 | U | 6/2013 | |
| CN | 208335953 | U | 1/2019 | |
| CN | 208478601 | U | 2/2019 | |
| DE | 102016119053 | A1 | 4/2018 | |
| DE | 102017223812 | A1 * | 6/2019 | H01R 4/56 |
| EP | 2840657 | A1 | 2/2015 | |
| FR | 2945156 | A1 | 11/2010 | |
| TW | 201633622 | A | 9/2016 | |
| WO | 2014181698 | A1 | 11/2014 | |

OTHER PUBLICATIONS

Machine Translation DE 102017223812 A1 (Jun. 27, 2019) (Year: 2024).*

PCT International Search Report and Written Opinion, Application No. PCT/EP2020/084918, Dated: Feb. 26, 2021, 14 pages.

Extended European Search Report, Application No. 19306621.4-1009, Dated: Jun. 4, 2020, 8 pages.

Chinese First Office Action dated Dec. 26, 2023 with English translation, corresponding to Application No. 202080084807.1, 19 pages.

* cited by examiner

CABLE LUG FOR A CONNECTOR

CROSS-REFERENCE TO RELATED APPLICATIONS

This application is a continuation of PCT International Application No. PCT/EP2020/084918, filed on Dec. 7, 2020, which claims priority under 35 U.S.C. § 119 to European Patent Application No. 19306621.4, filed on Dec. 10, 2019.

FIELD OF THE INVENTION

The present invention relates to a cable lug for a connector, in particular for a connector with a flexible fitting.

BACKGROUND

In the field of offshore wind applications, for example, it is known to use L- or T-connectors with a flexible fitting, e.g. made of silicone rubber insulating material, to connect cables with switchgears. Switchgears are made up of electrical disconnect switches used to control, protect, and isolate electrical equipment. Cables are connected to L- or T-connectors by a metallic cable lug.

The installation of these cables into the flexible fitting parts of the L- or T-connectors require an operator to apply a certain amount of pressure so that the resulting assembly can withstand high electrical tension and is tight enough for ensuring air and water resistance. In certain applications, a cable lug for a connector for high voltage systems is used, for example, for offshore wind energy up to 72.5 kV electrical systems. However, as the amount of pressure required for the installation increases for high voltage systems, i.e. up to 72.5 kV, the installation of the cable lug into the connector becomes more difficult as the operator has to apply an even greater force on the cable lug to fit it into the fitting part of the connector.

SUMMARY

A cable lug for a connector includes a first portion having a receiving end receiving a cable and a second portion extending from the first portion and having a through hole through which a stud can be passed. The through hole extends transversally through a first surface and a second surface of the second portion opposite one another. At least one of the first surface and the second surface has a protrusion projecting away from the at least one of the first surface and the second surface. The protrusion is positioned between the through hole and the first portion and is spaced apart from the first portion.

BRIEF DESCRIPTION OF THE DRAWINGS

The invention will now be described by way of example with reference to the accompanying Figures, of which.

DETAILED DESCRIPTION OF THE EMBODIMENT(S)

The accompanying drawings are incorporated into the specification and form a part of the specification to illustrate several embodiments of the present invention. These drawings, together with the description, explain the principles of the invention. The drawings are merely for the purpose of illustrating examples of how the invention can be made and used and are not to be construed as limiting the invention to only the illustrated and described embodiments. Furthermore, several aspects of the embodiments may form—individually or in different combinations—solutions according to the present invention. The following described embodiments thus can be considered either alone or in an arbitrary combination thereof. Features and advantages will become apparent from the following more particular description of the various embodiments of the invention, as illustrated in the accompanying drawings, in which like references refer to like elements.

Figure 1:
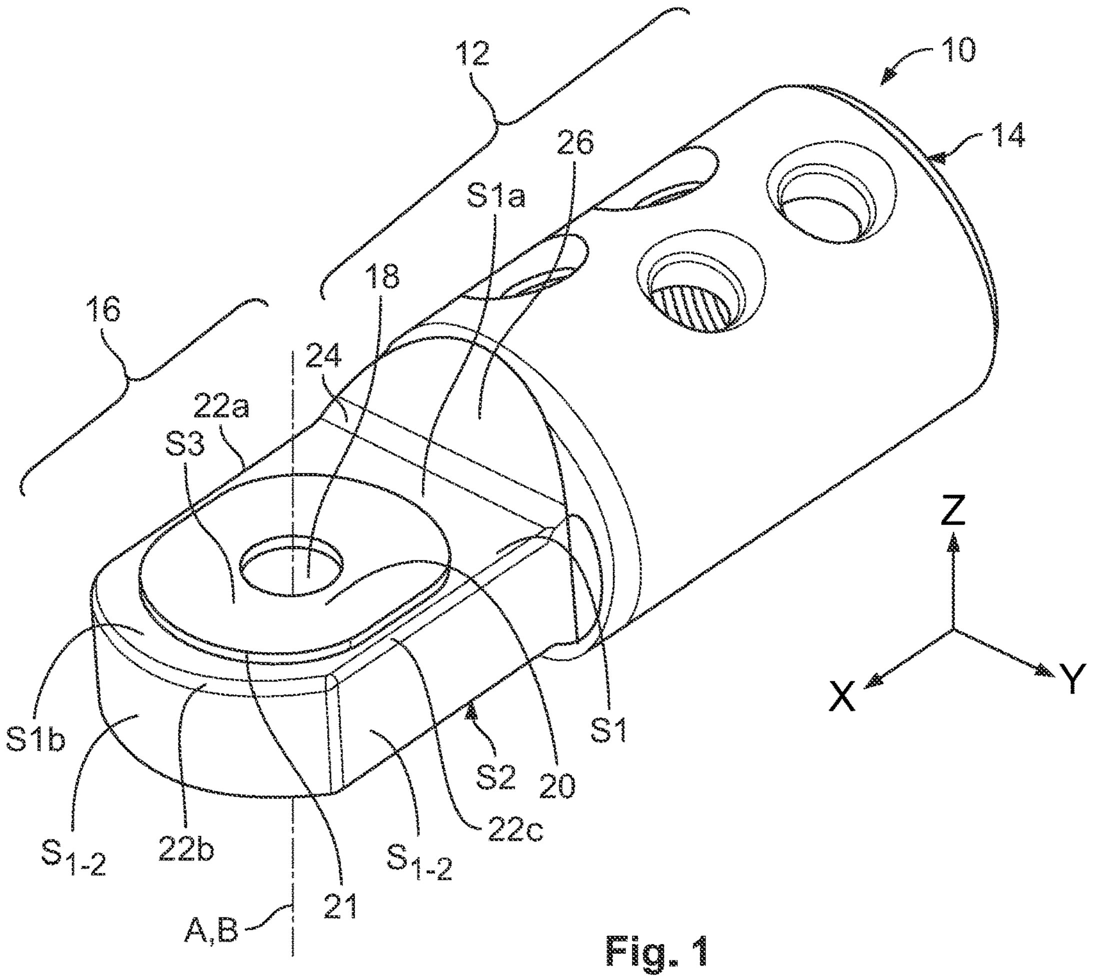
FIG. 1 is a perspective view of a cable lug according to an embodiment.

FIG. 1 illustrates a cable lug according to a first embodiment of the present invention.

The cable lug 10 comprises a first portion 12 comprising a receiving end 14 for receiving a cable such as a high-voltage cable. The cable lug further comprises a second portion 16 extending from the first portion 12. The second portion 16 comprises a through hole 18 configured and arranged such that a stud or a threaded pin can be passed therethrough. The through hole 18 can be a conical hole.

The through hole 18 extends transversally through two opposite surfaces S1, S2 of the second portion 16, as shown in FIG. 1. Hence, a central longitudinal axis A of the through hole 18 is transversal to each of the opposite surfaces S1, S2. The opposites surfaces S1, S2 are joined by a lateral surface S1-2.

The surface S1 of the second portion 16 has a protrusion 20 with a flat surface S3. The protrusion 20 projects away from the surface S1. Hence, a shoulder 21 is defined at the junction between the surface S1 and the surface S3.

In the first embodiment of the present invention, the protrusion 20 is essentially cylindrical and extends around the through hole 18 so that a central longitudinal axis B of the protrusion 20 is aligned with the central longitudinal axis A of the through hole 18.

In the first embodiment, each of the opposed surfaces S1, S2 are provided with the protrusion 20. Hence, in the following, the description related to the surface S1 fully applies to the surface S2.

In addition of improving the ease of manufacturing the cable lug 10 thanks to its symmetrical structure, no step of orientation of the cable lug 10 is required for the assembly, which is a significant advantage for blind assembly.

In a variant, each surface S1, S2 may be provided with a protrusion 20 of different shape. In another variant, only one surface S1, S2 may be provided with a protrusion 20.

According to one embodiment, the at least one protrusion 20 may comprise two distinct protruding portions, one protruding portion being adjacent to the through hole 18 and towards a terminal free end 22*b* of the second portion 16, another protruding portion being adjacent to the through hole 18 and towards the first portion 12. Hence, because such structure requires removing further material for machining the cable lug 10, the weight of such cable lug 10 can be lightened.

As shown in FIG. 1, the essentially cylindrical protrusion 20 is spaced apart from all borders, i.e. from all free edges 22*a*, 22*b*, 22*c* of the surface S1 of the second portion 16 as well as from the first portion 12. Hence, the surface S1 constitutes a circumference surface S1 around the protrusion 20. The protrusion 20 is further spaced away from the free edge 22*c* and the first portion 12, than from the free edges 22*a*, 22*b*. Thereby, a first open surface Sla, also referred as "first surface Sla" in the following, is defined between the first portion 12 and the protrusion 20. A second open surface S1*b*, also referred as "second surface S1*b*" in the following, is delimited between the protrusion 20 and the free edge 22*b* of the second portion 16, corresponding to a terminal free end 22*b* of the second portion 16.

Figure 2:
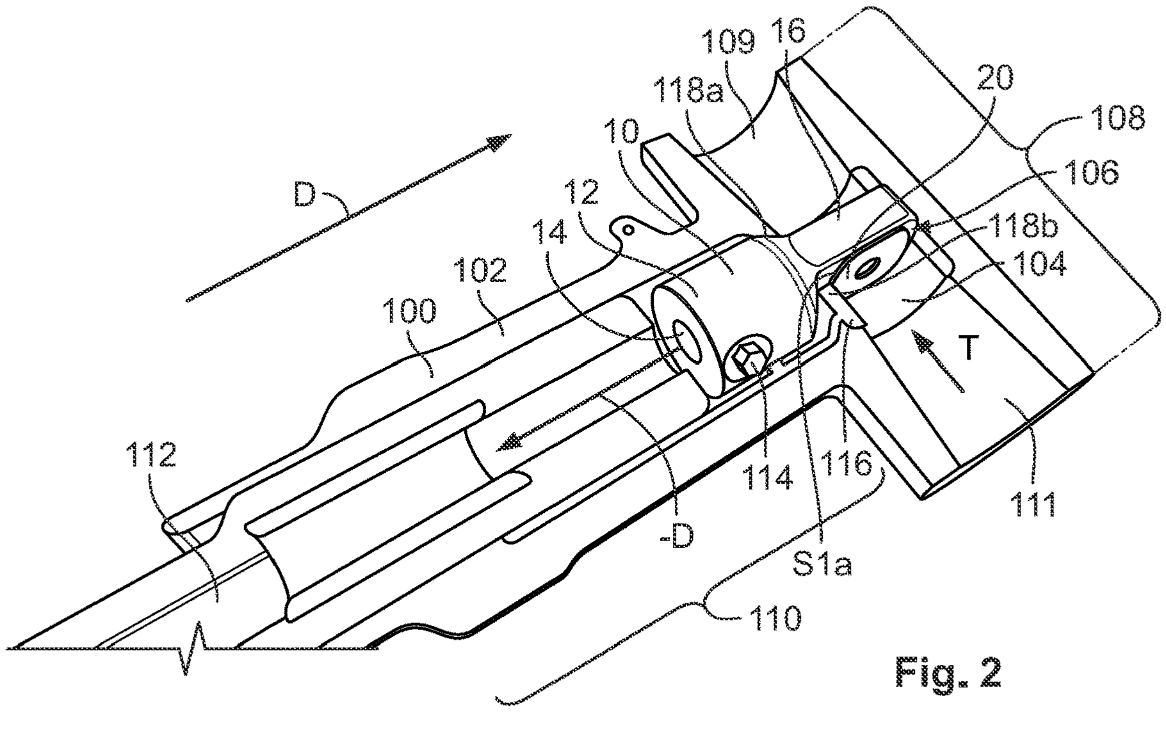
FIG. 2 is a sectional view of the cable lug inserted into a T-connector.
Figure 3:
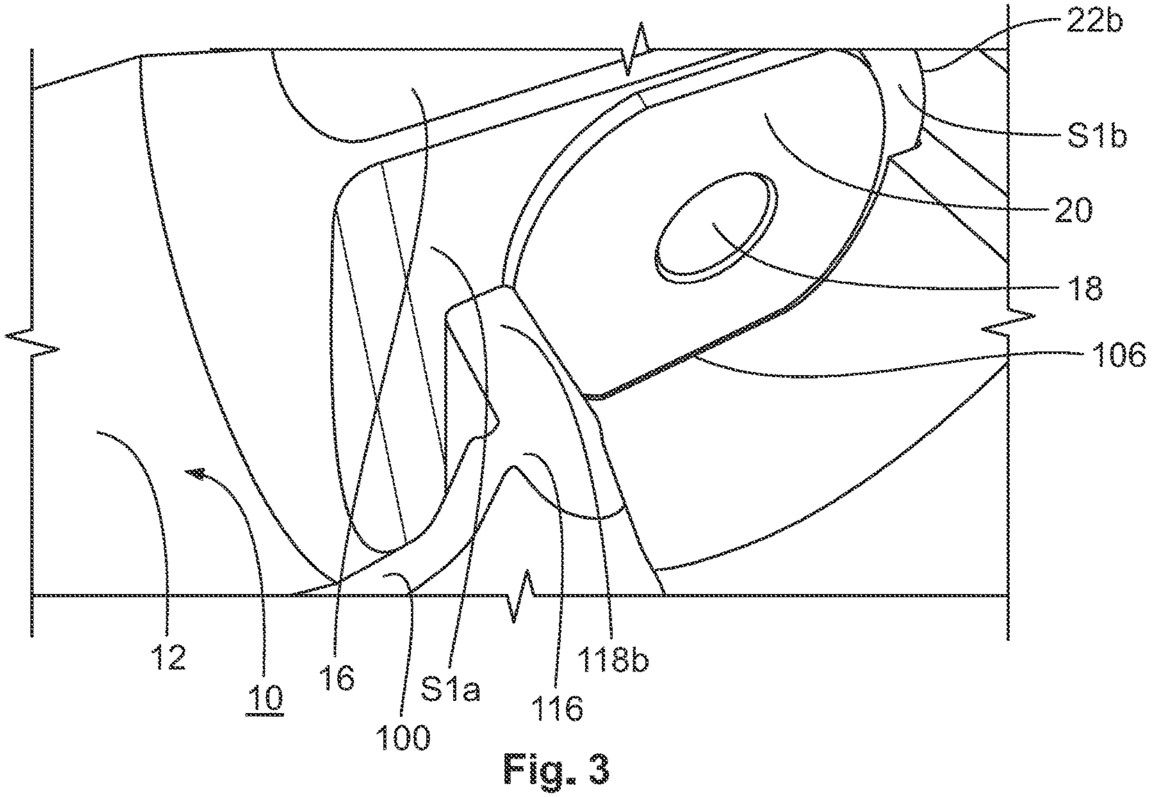
FIG. 3 is a detail view of a portion of FIG. 2.
Figure 4:
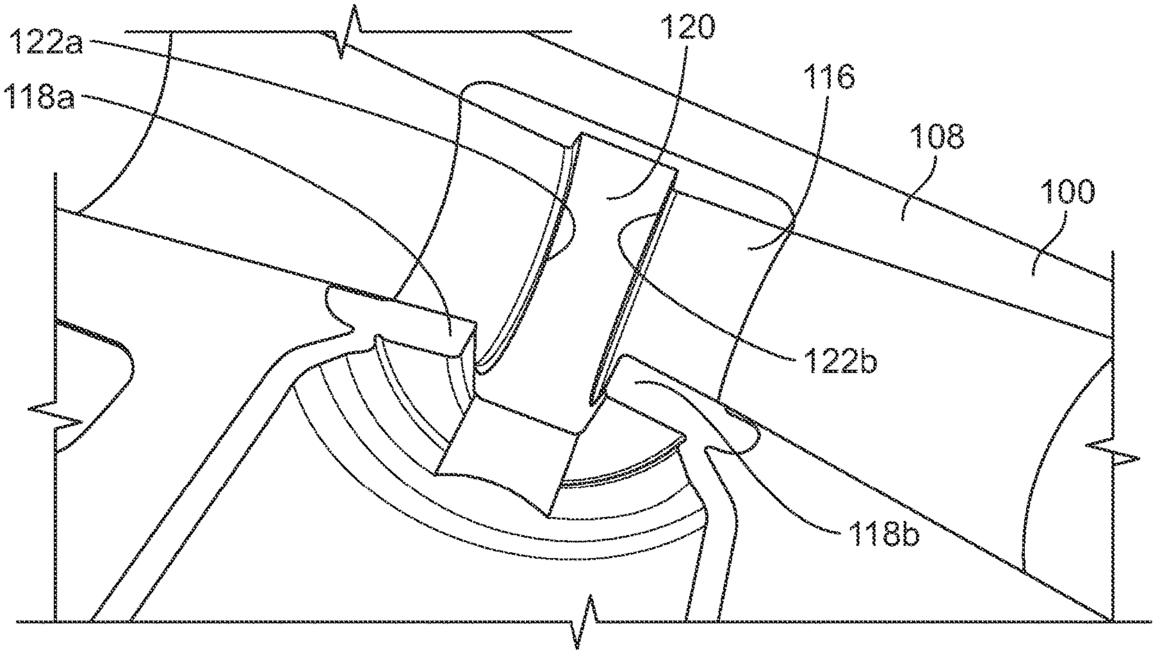
FIG. 4 is a sectional detail view of a T-connector receiving a cable lug according to an embodiment.

The technical advantage provided by the first surface S1*a* and the second surface S1*b* resulting from the presence of the protrusion 20 will be detailed with respect to the description of FIGS. 2 to 4.

As can be seen in FIG. 1, at a transition 24 between the first portion 12 and the second portion 16, the cross-section of the second portion 16 is smaller than the cross-section of the first portion 16, said cross-sections being considered in a plane (YZ) of the Cartesian plane as represented in FIG. 1. Moreover, the first portion 12 has a beveled shape 26 towards the second portion 16 to ease further the assembly of the cable lug 10 into a connector.

In the first embodiment, the first portion 12, the second portion 16 and the protrusion 20 are integrally manufactured in one-piece. Hence, the manufacturing of the cable lug 10 can be optimized such that the production cost and the production time can be minimized.

In the following, elements with the same reference numeral already described and illustrated in FIG. 1 will not be described in detail again but reference is made to their description above.

FIG. 2 illustrates a cross-sectional view of the cable lug 10 inserted into a T-connector 100 along an insertion direction D. An assembly according to an embodiment comprises the cable lug 10 and the T-connector 100. As FIG. 3 illustrates a zoomed view of FIG. 2, FIG. 2 and FIG. 3 are described together in the following. In a variant, the cable lug 10 can be inserted into a L-connector.

The T-connector 100 can be an outer cone screened separable T-connector for a voltage level of 72.5 kV. The T-connector 100 is molded into two different materials in an embodiment: an insulative rubber 102 and a semiconductor rubber 104.

A fitting part 106 is provided into a transversal portion 108 of the T-connector 100. The fitting part 106 is positioned between two conical receiving ends 109, 111 comprised in the transversal portion 108, as shown in FIG. 2. Each conical receiving end 109, 111 is adapted for housing a conical connection of a mating device inserted along a direction T, as indicated by the arrow T in FIG. 2. The direction T is essentially transversal to the insertion direction D.

The transversal portion 108 of the T-connector 100 is transversal to a longitudinal portion 110 of the T-connector 100.

The longitudinal portion 110 comprises a longitudinal recess 112 designed to accommodate a high-voltage cable. Such high-voltage cable is foreseen to terminate with the cable lug 10, which, in an assembled state, protrudes into the fitting part 106 of the transversal portion 108, as can be seen in FIG. 2.

A high-voltage cable can be inserted into the receiving end 14 of the second portion 12 and can be attached to the cable lug 10 by at least one threaded bold 114.

As shown in FIGS. 2 and 3, at a junction 116 between the transversal portion 108 and the longitudinal portion 110 of the T-connector 100, flexible tongues 118*a*, 118*b* made of semiconductor rubber 104 or an elastomer extend from the longitudinal recess 112 along a direction parallel to the direction T. That is to say, the flexible tongues 118*a*, 118*b* extend from the longitudinal recess 112 along a direction essentially transversal to the insertion direction D.

In the assembled state represented in FIG. 2 and in FIG. 3, each flexible tongue 118*a*, 118*b* is blocked between the first portion 12 and the protrusion 20. The cable lug 10 provides a stop element at the first surface S1*a*, which allows retaining the cable lug 10 in the fitting part 106. Hence, a spring-back effect can be avoided as a movement of the cable lug 10 in a direction (−D) opposite to the insertion direction D is prevented. The beveled shape 26 allows facilitating the insertion of the cable lug 10 into the connector 100, in particular it helps deflecting flexible tongues 118*a*, 118*b*.

Furthermore, as can be seen in FIG. 3, the second surface S1*b* of the cable lug 10 comprised between the free terminal end 22*b* of the second portion 16 and the protrusion 20 abuts against a lateral wall of a groove provided in the fitting part 106. Such a groove is represented in FIG. 4, which illustrated a fitting part 106 of the T-connector 100 without the cable lug 10. The fitting part 106 comprises a groove 120 provided with two lateral walls 122*a*, 122*b*.

The circumference surface S1 provided around the protrusion 20 can be fitted into the groove 120 of the fitting part 116. Thereby, when the cable lug 10 is inserted into the T-connector 100, as represented in FIGS. 2 and 3, the circumference surface S1 provides a contact surface pressed against the lateral wall 122*b* of the groove 120 (the same applies for surface S2 against the lateral wall 122*a*), which allows improving the positioning of the cable lug 10 into the T-connector 100.

The presence of the shoulder 21 prevents bending the fitting part 106 when the cable lug 10 is inserted into the connector 100 as, at the shoulder 21, the thickness between the two opposite surfaces S1, S2, is smaller than the thickness of the rest of the second portion 12: the part with the smaller thickness can thus be more easily inserted into a corresponding groove 120 of the fitting part 106. The protrusion 20 towards the free end 22*b* then abuts along the groove 120 of the fitting part 106 and allows ensuring a correct positioning of the cable lug 10 into the connector 100.

A correct positioning of the cable lug 10 ensures the through hole 18 of the cable lug 10 to be well concentric with a threaded pin configured to be inserted therein. Hence, the electrical and mechanical performance contact of the resulting assembly can be improved.

Moreover, the abutment of the lateral surface S3 of the cable lug 10 against the groove 120 in the insertion direction D allows facilitating the blind assembly of the cable lug 10 into the T-connector 100.

Figure 5:
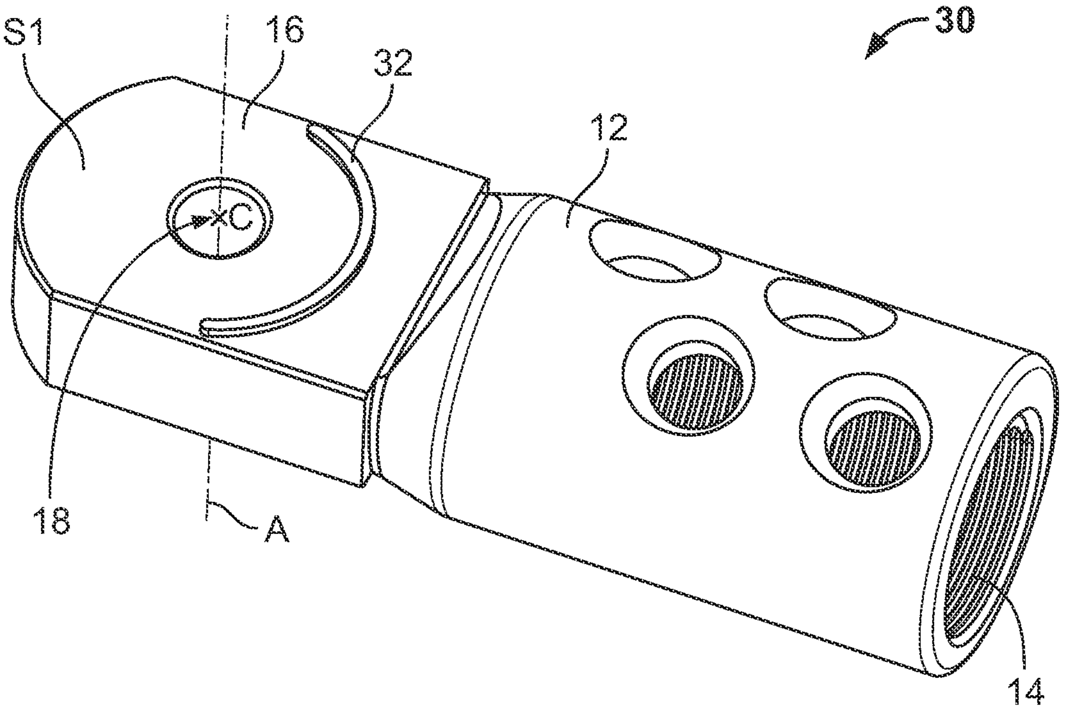
FIG. 5 is a perspective view of a cable lug according to another embodiment.

FIG. 5 illustrates a cable lug 30 according to a second embodiment of the present invention. The cable lug 30 according to the second embodiment differs from the cable lug 10 in that the surface S1 comprises a circular arc shaped protrusion 32 provided between the first portion 12 and the through hole 18. The center C of the circular arc 32 is localized on the central longitudinal axis A of the through hole 18.

Hence, as for the first embodiment, the cable lug 30 provides a stop between the circular arc shaped protrusion 32 and the first portion 12 wherein a flexible tongue (like the flexible tongues 118*a*, 118*b*) of a T-connector can be retained. Thus, a spring-back effect can be avoided during assembly and in the assembly stated of the cable lug into the T-connector.

Although the embodiments have been described in relation to particular examples, the invention is not limited and numerous alterations to the disclosed embodiments can be made without departing from the scope of this invention. The various embodiments and examples are thus not intended to be limited to the particular forms disclosed. Rather, they include modifications and alternatives falling within the scope of the claims and individual features can be freely combined with each other to obtain further embodiments or examples according to the invention.

What is claimed is:

1. A cable lug for a connector, comprising:

a first portion having a receiving end receiving a cable, the first portion has a threaded bolt attaching the cable to the cable lug; and a second portion extending from the first portion and having a through hole through which a stud can be passed, the through hole extends transversally through a first surface and a second surface of the second portion opposite one another, at least one of the first surface and the second surface has a protrusion projecting away from the at least one of the first surface and the second surface, the protrusion is positioned between the through hole and the first portion and is spaced apart from the first portion.

2. The cable lug of claim 1, wherein the protrusion is a first protrusion and further comprising a second protrusion projecting away from the one of the first surface and the second surface that is opposite to the one of the first surface and the second surface that has the first protrusion.

3. The cable lug of claim 2, wherein the second protrusion is between the through hole and the first portion.

4. The cable lug of claim 3, wherein the second protrusion is spaced apart from the first portion.

5. The cable lug of claim 2, wherein the first protrusion and the second protrusion have a same shape.

6. The cable lug of claim 1, wherein the protrusion extends around the through hole.

7. The cable lug of claim 6, wherein the protrusion is spaced apart from a terminal free end of the second portion.

8. The cable lug of claim 1, wherein, at a transition between the first portion and the second portion, a cross-section of the second portion is smaller than a cross-section of the first portion.

9. The cable lug of claim 8, wherein the first portion has a beveled shape toward the second portion.

10. The cable lug of claim 1, wherein the protrusion is cylindrical and has a central longitudinal axis aligned with a central longitudinal axis of the through hole.

11. The cable lug of claim 10, wherein the protrusion is spaced apart from all of a plurality of borders of the second portion and from the first portion.

12. The cable lug of claim 1, wherein the protrusion has a pair of distinct protruding portions.

13. The cable lug of claim 12, wherein the pair of distinct protruding portions include a first protruding portion adjacent to the through hole and toward a terminal free end of the second portion and a second protruding portion adjacent to the through hole and toward the first portion.

14. The cable lug of claim 1, wherein the first portion, the second portion, and the protrusion are integrally manufactured in a single piece.

15. An assembly, comprising:

a T-connector having a pair of flexible tongues; and a cable lug inserted into the T-connector with the flexible tongues engaging the cable lug, the cable lug including a first portion having a receiving end receiving a cable and a second portion extending from the first portion and having a through hole through which a stud can be passed, the through hole extends transversally through a first surface and a second surface of the second portion opposite one another, at least one of the first surface and the second surface has a protrusion projecting away from the at least one of the first surface and the second surface, the protrusion is positioned between the through hole and the first portion and is spaced apart from the first portion.

16. The assembly of claim 15, wherein the T-connector has a longitudinal portion and a transversal portion extending transverse to the longitudinal portion.

17. The assembly of claim 16, wherein the transversal portion has a fitting part positioned between a pair of conical receiving ends.

18. The assembly of claim 16, wherein the flexible tongues are positioned at a junction between the transversal portion and the longitudinal portion, the flexible tongues extending transverse to an insertion direction of the cable lug into the T-connector.

19. The assembly of claim 18, wherein each of the flexible tongues is blocked between the first portion and the protrusion.

20. The assembly of claim 15, wherein the T-connector is molded from an insulative rubber and a semiconductor rubber.

* * * * *